Jan. 28, 1958            K. KÖRBER            2,821,200
APPARATUS FOR MANUFACTURING FILTER MOUTHPIECE CIGARETTES
Original Filed Feb. 5, 1954            3 Sheets-Sheet 1
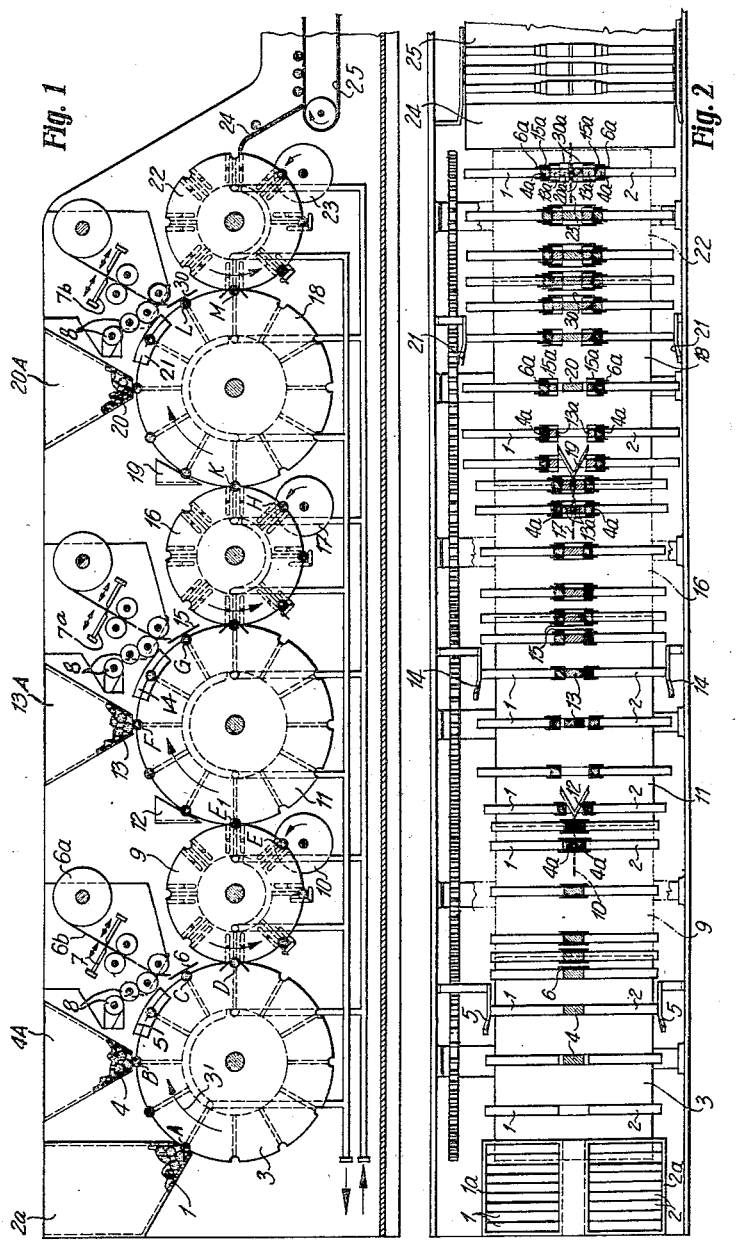
INVENTOR:
Kurt Körber Jan. 28, 1958     K. KÖRBER     2,821,200
APPARATUS FOR MANUFACTURING FILTER MOUTHPIECE CIGARETTES
Original Filed Feb. 5, 1954     3 Sheets-Sheet 2
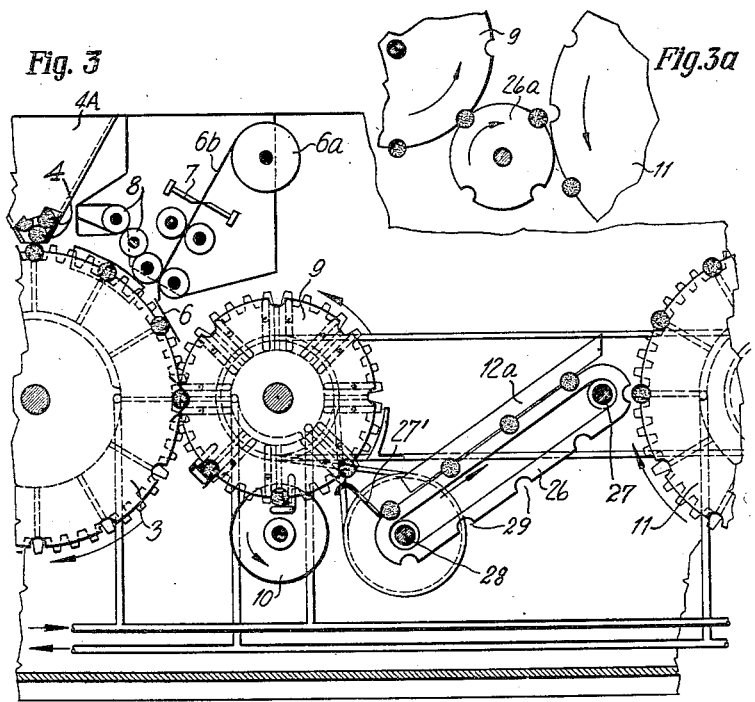
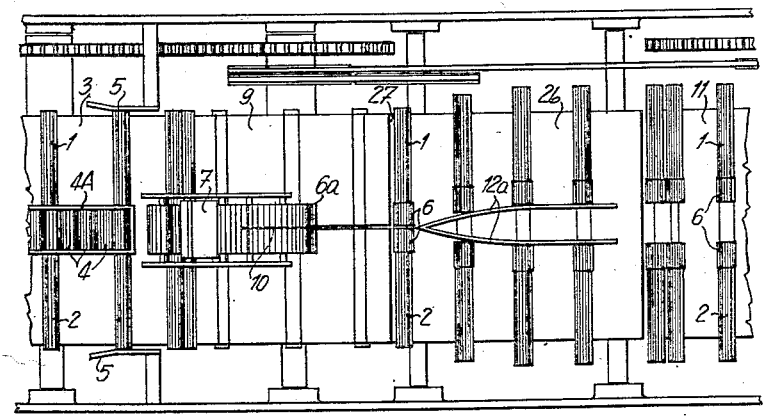

Jan. 28, 1958 K. KÖRBER 2,821,200
APPARATUS FOR MANUFACTURING FILTER MOUTHPIECE CIGARETTES
Original Filed Feb. 5, 1954 3 Sheets-Sheet 3

INVENTOR:
Kurt Körber
BY Singer Stern & Carlberg
Attorneys.

United States Patent Office 2,821,200
Patented Jan. 28, 1958

2,821,200

APPARATUS FOR MANUFACTURING FILTER MOUTHPIECE CIGARETTES

Kurt Körber, Hamburg-Bergedorf, Germany

Original application February 5, 1954, Serial No. 408,526, now Patent No. 2,740,409, dated April 3, 1956. Divided and this application September 22, 1955, Serial No. 535,974

Claims priority, application Germany February 24, 1953

5 Claims. (Cl. 131—94)

The invention relates to the manufacture of cigarettes and particularly is directed to an apparatus for manufacturing cigarettes and the like, provided with mouthpiece portions consisting, for instance, of filter bodies, hollow mouthpieces or the like, by employing uniting bands which unite a mouthpiece portion with the cigarette body.

The present invention is a division of my pending United States patent application Serial No. 408,526, filed on February 5, 1954, issued as United States Patent 2,740,409, April 3, 1956.

A very important object of the invention is to provide cigarettes with a mouthpiece or tip composed of more than one filter body by means of a very efficient apparatus which is simple and permits the economical production of filter tip cigarettes.

It is another object of the present invention to unite the filter bodies with a length of cigarette rod by means of a plurality of successively arranged devices, all of which perform substantially the same operations in that after the attachment of one filter body, the following filter bodies are connected to previously produced composite cigarette rod and filter portions in substantially the same manner by an additional uniting band which covers not only the last attached filter body, but also the preceding one, in order to produce composite cigarettes having mouthpieces secured in a very effective manner to the tobacco rod.

The drawing illustrates diagrammatically the method of the invention in connection with an apparatus.

Fig. 1 illustrates a side elevation view of the apparatus with certain parts shown in section.

Fig. 2 is a top view of the apparatus in which the rotary drums for wrapping the uniting bands around the assemblages of cigarette rods and mouthpiece portions are illustrated for the sake of clearness in dotted lines, while the magazines which feed the mouthpieces or filter bodies into the apparatus have been omitted. For the sake of clearness, the uniting bands and the mouthpieces, such as filter bodies, have been shown in sections.

Fig. 3 illustrates in side elevation view and partly in section a conveying device which may be arranged between each two rotary drums of the apparatus.

Fig. 3a illustrates diagrammatically a modification of the conveying device which may be used in place of the one shown in Fig. 3.

Fig. 4 illustrates a top view of the conveyor device as shown in Fig. 3.

Figure 5:
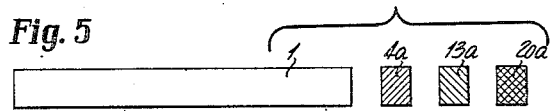
Figs. 5 to 10 illustrate each diagrammatically filter mouthpiece cigarettes during different stages of their manufacture.

Referring to Figs. 1 and 2, the two cigarette holding magazines 1a and 2a are arranged parallel to each other, but are laterally spaced from each other. The cigarettes are deposited one pair at a time by these magazines at A into the axially extending grooves of a rotary suction drum 3 in such a manner that the two cigarettes 1 and 2 of each pair in each groove are axially spaced from each other a pre-determined distance. The drum 3 rotates in the direction of the arrow 3'. During the continued rotation of the drum 3, and when the cigarettes within the grooves thereof reach the point "B," a filter body 4 is deposited between the axially aligned cigarettes 1 and 2. This filter mouthpiece 4 has a length twice that of the filter body portion in the finished cigarette. The filter bodies 4 are supplied by a single magazine 4A which discharges the filter bodies one at a time.

From the point "B," the assemblage, consisting of two axially aligned cigarettes 1 and 2 and a filter body 4 therebetween, of the mentioned double length, is moved past guide plates 5, which are arranged at the outer ends of the assemblage in such a manner that the cigarettes 1 and 2 are axially pushed toward each other into engagement with both ends of the filter body 4. This axially compacted assemblage is moved then past the point C, at which point C the assemblage is provided with a uniting band 6, which is attached to the portion of the circumference of the assemblage projecting from the groove of the rotary drum 3. The band 6 is supplied by spool 6a from which a continuous band 6b is unwound which is cut into pieces of the desired length by a cutting device 7. The individual pieces are provided on one side with an adhesive by an adhesive applying device 8. At the point D, the assemblage with the uniting band 6 attached thereon, is transferred to a second rotary drum 9 in such a manner that the uniting band 6 at the point of transfer D is partially folded around the assemblage by being pressed into an axial groove of the rotary drum 9. The drum 9 rotates counterclockwise, and during this rotation toward a point E, there are operated a number of radially movable wrapping members arranged on the drum 9. These wrapping members are only diagrammatically illustrated because the construction of the same is not of importance as far as the present invention is concerned. For an example of a construction of these wrapping members attention is called to United States patent application Schubert, Serial No. 338,360, filed February 24, 1953. At the point E, the completely wrapped cigarette assemblage is cut in two pieces by a rotary knife 10 which cuts through the center of the filter body 4 and which extends with its cutting edge into a suitable circumferential groove of the drum 9.

The cigarettes 1 and 2 are now provided each with a filter body 4a having one-half the length of the filter body 4. These cigarettes are now to be provided with a second filter body portion. For this purpose the cigarettes 1 and 2 with the filter body portions 4a thereon are transferred to another rotary section drum 11 which is provided with axial grooves. A stationary wedge-shaped guide member 12 separates the cigarettes axially from each other and at the point F there is inserted in the space between the adjacent ends of the cigarettes another filter body 13 supplied by a magazine 13A. These filter bodies 13 also have a length twice that of the filter body portion in the completed cigarettes. Now the drum 11 repeats the same operations which took place in connection with the drum 3 in that the cigarette assemblage 1, 2, 4a and 13, positioned at F in a groove of the drum 11, is again axially pushed together by laterally arranged guide plates 14, while at the point G an adhesive-coated uniting band 15 is attached to the mentioned assemblage. This uniting band 15 is again partially wrapped around the cigarette assemblage at the point where the cigarette assemblage is transferred to a rotary drum 16 provided with radial wrapping members which complete the wrapping of the uniting band around the assemblage during the rotation of the drum 16 in a counterclockwise direction. The rotary knife 17 cuts the cigarette assemblage in two pieces by cutting through the center of the filter body 13, and transfers the cut cigarettes to the next drum 18 which rotates in a clockwise direction.

Each cigarette 1 and 2 is now provided with two filter body portions 4a and 13a, and also with two uniting bands 6 and 15.

These composite cigarettes are now to be provided with a third filter body portion for which purpose the rotary suction drum 18 is employed, which has a number of axially extending grooves, each of which is adapted to receive two cigarettes as produced at the point K.

Again a wedge-shaped guide member 19 separates the two axially aligned cigarettes so that a space is produced between the same for the insertion of a third filter body 20, which again has a length twice that of the filter body portion to be provided in the finished cigarette. The filter bodies 20 are supplied by a magazine 20A. Now the operations which have taken place on the drums 3 and 11 are repeated on the drum 18. The composite cigarettes are axially pushed together by the guide plates 21. At the point L is attached to the assemblage in adhesive-coated uniting band 30. At M the cigarette assemblage with the uniting band 30 thereon is transferred to the drum 22, which latter is again provided with radial wrapping members for wrapping the uniting band entirely around the cigarette assemblage, whereupon the rotary knife 23 separates the assemblage again into two parts by cutting through the center of the filter body 20.

In this manner there are produced cigarettes 1 and 2 which are each provided with three filter portions 4a, 13a and 20a, and these filter portions are united with cigarette rod bodies by the uniting bands 6, 15 and 30. These complete cigarettes are now discharged by a guide plate 24 onto an endless conveyor 25.

All of the drums mentioned operate upon the cigarettes and the filter bodies by suction, to assure a safe holding of the cigarettes and filter bodies on the drums, and a safe transfer of the same from one drum to the next one. The drums are operatively connected with each other by gears to form a continuous gearing, which is driven by a prime mover—for instance, by an electric motor or the like.

The apparatus described, or only a portion of the same, may be used for producing cigarettes with only one filter body—even when for the purpose of convenience it may be advisable to unite one and the same filter body at one point with one or two or more uniting bands to the cigarette body. Such multibanded filter-tipped cigarettes have a considerable advantage. First of all, an advantage is obtained that the critical joint between the length of the cigarette rod and the filter body is substantially reinforced by the multiple uniting bands, which is of particular advantage when, for instance, cigarettes are provided with these filters so that a cigarette may be consumed almost to its very end. Furthermore, it is also possible to produce filter-tipped cigarettes with soft tobacco bodies which, until now—in view of the unsecure joint between the cigarette rod and the filter body, or mouthpiece—could not be made successfully. Finally, the mouthpiece itself, if made hollow, is substantially made stronger so that it cannot be pressed together very easily.

It is also another object of the invention to arrange between the rotary drums 9 and 11 and between the rotary drums 16 and 18, respectively, a special conveyor device, such as is shown by way of example in Figs. 3 and 4.

According to Fig. 3, there is arranged an endless conveyor 26 guided over roller shafts 27 and 28, and arranged between the two drums 9 and 11. This endless conveyor 26 is provided in its outer face with transversely extending grooves 29. The grooves 29 receive axially alined cigarettes provided with filter bodies from a guide plate 27'. The wedge-shaped guide member 12, as shown in Fig. 1, is arranged in the embodiment of Figs. 3 and 4 in the form of a guide member 12a above the endless conveyor 26. In place of the endless conveyor 26, there may also be arranged a rotary drum 26a, as shown by way of example in Fig. 3a.

In the foregoing, the method of the invention has been described in connection with an apparatus which produces multiple filter mouthpiece cigarettes. In connection therewith, attention is now called to Figs. 5 to 10, which illustrates the details of such cigarettes. In these figures the cigarettes are only illustrated by way of example.

Figure 10:
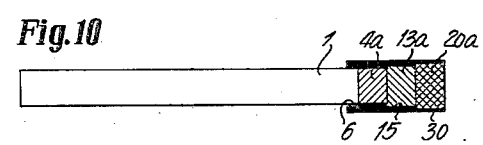

According to Fig. 10, the cigarette 1 is provided with three filters—namely, with a filter 4a made of crepe paper, a filter 13a, consisting of paper cuttings, and a ceramic-like filter 20a.

Figure 6:
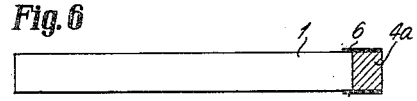
Figure 7:
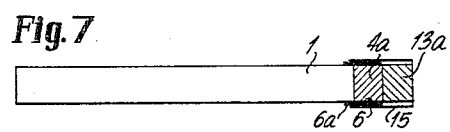
Figure 8:
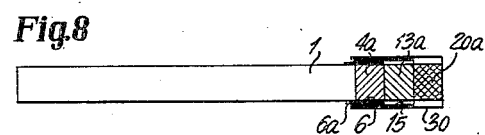

As described in the foregoing, the magazine 4a supplies the crepe filter 4a, which is united with the cigarettes by a uniting band 6, as shown in Fig. 6. The uniting band 6 extends a short distance beyond the filter 4a in order to unite the latter securely with the cigarette 1. After these single filter cigarettes have been deposited on the drum 11, they are provided on this drum 11 with the paper cutting filter 13a, as shown in Fig. 7. The filter 13a is attached to the crepe filter 4a by means of a uniting band 15, so that after cutting the assemblage in two parts, the two cigarettes show each an annular zone 6a on the circumference of the uniting band 6, or—in other words—the uniting band 15 does not extend to the very end of the uniting band 6. Hereupon the cigarettes having two filters are provided on the drum 18 with a third or a ceramic-type filter 20a which is attached to the paper cutting filter 13a by means of a third uniting band 30 in such a manner that according to Fig. 8 there remains on the circumference of the uniting band 6 the previously mentioned exposed annular zone 6a.

Figure 9:
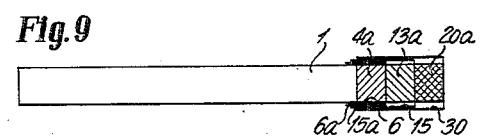

According to Fig. 9, the uniting band 30 for the ceramic-type filter 20a is made somewhat shorter so that there appears on the cigarette two exposed annular zones 6a and 15a on the circumference of the uniting bands 6 and 15, respectively.

Fig. 10 illustrates, by way of example, still another embodiment in which none of the uniting bands show an exposed annular zone.

The uniting bands may also have different colors. For instance, the uniting band 6 for the filter body 4a may be red. When now the uniting band 15 for the filter body 13a is applied around the uniting band 6 and forms the mentioned exposed annular zone 6a, then one will notice a narrow red ring which in the present case may indicate that the cigarette, as shown in Fig. 7, is provided with a double filter having certain characteristics. The uniting band 15 for the paper cuttings filter 13a may furthermore be distinctively colored and the exposed annular zone 15a, as shown in Fig. 9, may indicate that the cigarette is provided, for instance, with a glow retarding mouthpiece. In such a case, there are provided two differently colored annular zones 6a and 15a. According to Fig. 8, the two outermost uniting bands 15 and 30 are so long in axial direction that only the annular zone 6a is visible, which again by means of another color, may indicate that the cigarette has a certain desired characteristic. Therefore, it should be apparent that by means of selecting uniting bands of various widths and various colors it is possible to produce on the cigarette certain annular zones which give the possibility of indicating to the smoker what characteristics the filter cigarettes have.

For the purpose of assuring that the individual filter bodies form a good joint or abutment with each other or with the cigarette rod, the filter bodies 4a, 13a and 20a may have a different circumference or diameter as, for instance, shown in Fig. 10. The serial arrangement of the filters adjacent to one another may, of course, be changed and also the diameters of the filters may be different, as shown in Fig. 10.

The uniting bands are provided on one side with an adhesive of good quality.

In order to provide the three filter-tipped cigarettes with a good appearance, the edges of the individual uniting bands which are closest to the mouth of the user are so arranged that they are placed correctly one over the other.

A substantial advantage of the method of the present invention consists therein that it is possible to produce multiple filter-tipped cigarettes in an economical manner, whereby the filter bodies have the same exterior form as the cigarettes. Accordingly to the invention, there is obtained a high stability of the completed multiple filter-tipped cigarettes which is much superior to the well-known double filtered cigarettes in which a crepe paper filter is arranged behind a cotton plug.

It is well known that a filter-tipped cigarette with a cotton plug and a crepe paper filter has an unstable form caused by the cotton plug and can only be manufactured with difficulty. Furthermore, filter-tipped cigarettes with cotton plugs have the disadvantage that they bend very easily and break at the point where the cotton plug engages the cigarette rod. All these disadvantages are not present when the cigarettes are being made in accordance with the present invention.

The various filter bodies may be prepared in a number of different manners and may also be provided with certain desired chemical and physical characteristics, and, furthermore, the filter action itself may be selected as desired by employing certain raw materials or the like.

The shape of all the filter bodies may be substantially the same and may correspond to the exterior shape of the tobacco rod. It is also possible, according to the invention to provide the filter plugs, which have the same shape, or approximately the same shape as the cigarette body, with different colors by either coloring the entire circumference or only a portion of the circumference of the filter bodies, or the uniting bands. In this manner, another feature of the invention is obtained—namely, that the particular filter action of each filter body is visibly indicated by the selected color. The smoker, therefore, has the opportunity to recognize from the appearance of the cigarette that he may obtain a cigarette provided with a particular type of a multiple filter in its mouthpiece.

Figure 11:
Fig. 11 illustrates a filter mouthpiece cigarette provided with only one filter body.

Fig. 11 illustrates a single filter-tipped cigarette which is also manufactured in accordance with the method of the present invention in that one and the same filter body 4a is united with the cigarette 1 by two uniting bands 6 and 15. Both of these uniting bands extend beyond the end face of the cigarette body 1 so that the joint between the cigarette body and the filter body is covered by a double thickness of uniting bands, which has the result that the mouthpiece has increased strength.

What I claim is:

1. Apparatus for the manufacture of filter mouthpiece cigarettes in which each mouthpiece contains a plurality of filters, comprising a plurality of pairs of rotary drums having axially extending grooves on their circumferences for receiving therein axially alined cigarettes and filter-bodies and conveying the same successively from one to another of said drums, there being one pair of said drums for each filter body to be contained in the cigarette mouthpiece, cigarette magazine means for the first drum of the first pair of said drums and arranged to deposit a pair of axially alined spaced cigarettes in each groove of said first drum, filter body magazine means for said first drum and arranged to deposit a filter body between the axially alined cigarettes in said first drum, means for applying a uniting band to each cigarette filter assemblage on said first pair of drums, cutting means for cutting each cigarette filter assemblage in two parts, while on the second drum of said first pair of drums, each part containing one filter portion, means for transferring said cigarette filter parts from said first pair of drums to at least one other pair of drums, means for positioning an additional filter body between said cigarette filter parts while on the first drum of said other pair of drums, means for applying another uniting band to each cigarette filter assemblage on said other pair of drums, and cutting means for cutting each cigarette filter assemblage in two parts while on the second drum of said other pair of drums, each part containing at least two filter portions.

2. Apparatus for the manufacture of filter mouthpiece cigarettes as claimed in claim 1, in which said plurality of pairs of rotary drums are arranged in a continuous series so that the second drum of each pair transfers the cigarette assemblages to the first drum of the next following pair of rotary drums, and means cooperating with each following first rotary drum of said pairs of drums for separating the cigarettes transferred to it by the preceding drum by movement lengthwise of the cigarette a distance to permit insertion of a filter body between said separated cigarettes.

3. Apparatus for the manufacture of filter mouthpiece cigarettes as claimed in claim 1, in which said plurality of pairs of rotary drums are arranged in a continuous series so that the second drum of each pair transfers the cigarette assemblages to the first drum of the next following pair of rotary drums, means cooperating with each following first rotary drum for separating the cigarettes transferred to it by the preceding drum by a movement lengthwise of the cigarette a distance to permit insertion of a filter body between said separated cigarettes, and means adjacent the ends of each first rotary drum of said pairs of rotary drums for pushing the cigarettes axially together in engagement with the filter body inserted between the same prior to the application of the uniting bands to said cigarette assemblages.

4. Apparatus for the manufacture of filter mouthpiece cigarettes as claimed in claim 1, including an endless conveyor having transverse cigarette receiving grooves arranged between each second rotary drum of said pairs of drums and the following first drum of the next pair of drums to transfer the cigarette assemblage to the next pair of rotary drums.

5. Apparatus for the manufacture of filter mouthpiece cigarettes as claimed in claim 1, including an endless conveyor with transverse cigarette receiving grooves arranged between each second rotary drum of said pairs of drums and the following first drum of the next pair of drums to transfer the cigarette assemblage to the next pair of rotary drums, and a stationary guide member arranged above said endless conveyor for separating the assemblages on said conveyor by causing the cigarettes in each pair of alined cigarettes to move lengthwise in opposite directions away from each other.

References Cited in the file of this patent

UNITED STATES PATENTS

| | | |
|---|---|---|
| 2,156,600 | Molins | May 2, 1939 |
| 2,166,486 | Edwards | July 18, 1939 |